United States Patent [19]  [11] Patent Number: 4,618,472
Gjertsen et al.  [45] Date of Patent: Oct. 21, 1986

[54] NUCLEAR REACTOR FUEL ASSEMBLY WITH FUEL ROD REMOVAL MEANS

[75] Inventors: Robert K. Gjertsen, Monroeville; John F. Wilson; Walter F. Weiland, Jr., both of Murrysville, all of Pa.

[73] Assignee: Westinghouse Electric Corp., Pittsburgh, Pa.

[21] Appl. No.: 545,419

[22] Filed: Oct. 25, 1983

[51] Int. Cl.⁴ ................................................ G21C 3/32
[52] U.S. Cl. .................................. 376/446; 376/434; 376/443
[58] Field of Search ............... 376/446, 434, 440, 364, 376/261, 203, 443

[56] References Cited

U.S. PATENT DOCUMENTS

| 3,105,026 | 9/1963 | Dickson. | |
|---|---|---|---|
| 3,255,091 | 6/1966 | Frisch. | |
| 3,349,004 | 10/1967 | Lass et al.. | |
| 3,377,254 | 4/1968 | Frisch | 376/446 X |
| 3,741,868 | 6/1973 | Qurnell et al.. | |
| 3,770,583 | 11/1973 | Klumb et al.. | |
| 4,045,287 | 8/1977 | van Santen | 376/440 |
| 4,278,501 | 7/1981 | Steinke | 376/446 X |
| 4,427,624 | 1/1984 | Marlatt et al. | 376/446 X |
| 4,452,755 | 6/1984 | Hylton | 376/440 X |

FOREIGN PATENT DOCUMENTS

| 0130789 | 10/1979 | Japan | 376/446 |
|---|---|---|---|
| 5977381 | 5/1984 | Japan | 376/353 |

*Primary Examiner*—Deborah L. Kyle
*Assistant Examiner*—Dan Wasil

[57] ABSTRACT

A fuel assembly for a nuclear reactor is provided with two access plugs in the adapter plate of the top nozzle whereby selected fuel rods can be removed and replaced without disassembling the assembly and while the assembly is in place in its operating position in the core region.

11 Claims, 5 Drawing Figures

NUCLEAR REACTOR FUEL ASSEMBLY WITH FUEL ROD REMOVAL MEANS

CROSS REFERENCE TO RELATED APPLICATIONS

Reference is hereby made to the following copending applications dealing with related subject matter and assigned to the assignee of the present invention.

1. "Reconstituting A Nuclear Reactor Fuel Assembly" by Robert K. Gjertsen, John F. Wilson, and John M. Shallenberger; U.S. Ser. No. 564,056, filed Dec. 21, 1983.

2. "Nuclear Reactor Fuel Assembly With Improved Top Nozzle And Hold Down Means", by Robert K. Gjertsen and Luciano Veronesi; U.S. Ser. No. 542,625, filed Oct. 17, 1983.

BACKGROUND OF THE INVENTION

The present invention relates generally to fuel assemblies for nuclear reactors and, more particularly, is directed to a fuel assembly wherein selected ones of its fuel rods can be removed remotely without disassembling the assembly.

In most nuclear reactors the core portion is comprised of a large number of elongated fuel elements or rods grouped in and supported by frameworks referred to as fuel assemblies. The fuel assemblies are generally elongated and receive support and alignment from upper and lower transversely extending core support plates. In the most common configuration, the axis of the core support barrel extend vertically and the various fuel assemblies are also arranged vertically resting on the lower support plate. Conventional designs of these fuel assemblies include a plurality of fuel rods and control rod guide thimbles held in an organized array by grids spaced along the fuel assembly length and attached to the control rod guide thimbles. Top and bottom nozzles on opposite ends thereof are secured to the control rod guide thimbles in thereby forming an integral fuel assembly. The respective top and bottom nozzles extend slightly above and below the ends of the fuel rods, capturing the rods therebetween.

It's common, in the startup of new or prototype reactors, to routinely inspect and examine selected ones of the fuel assemblies after stated time intervals of operation. Besides checking for failed fuel rods and examining the wear to the assembly and the deterioration characteristics of the fuel rods themselves, some of the fuel rods may be exchanged with another type of rod wherein a more desired enrichment of the fisson materials is sought. Normally, during operation of a reactor, the fuel assemblies in the active core region are submerged under approximately thirty feet of water, or other suitable coolant, and each fuel assembly is snugly fitted among adjacent assemblies of the organized array. And thus, in order to perform the examination and inspection process, a selected fuel assembly is generally lifted out from its operating position and removed completely out of the reactor or to a convenient work station where the necessary inspection and examination steps are performed while the assembly is still submerged under approximately six feet of collant water. If it is detected that some of the rods have failed or if it is desired to exchange or substitute rods of different composition, it was the past practice to discard the whole fuel assembly and install a new one in its place.

More recently, reconstitutable fuel assemblies have been developed, and rather than discarding the assembly, the fuel assembly can now be refurbished or reconstructed thereby saving many of its expensive components. Conventional reconstitutable fuel assemblies incorporate design features wherein the top nozzle is removed from the assembly in providing access to the fuel rods contained therein. After rod removal and replacement, a new or refurbished top nozzle is secured to the assembly. Due to the space restrictions among the assemblies and the difficulty on working on an assembly located thirty feet under water, reconstitution of a fuel assembly is generally carried out at a remote work station rather than in place. Although reconstitution is less costly than discarding a fuel assembly, it involves labor and down time of the reactor which all equate into added costs.

Thus, in view of the high costs associated with replacing and/or reconstituting fuel assemblies, both domestic and foreign utilities have expressed an interest in fuel assembly, which can be used in the startup of new or prototype reactors, wherein a limited number of fuel rods of preselected fuel assemblies can be removed and replaced remotely for on-site inspection and examination without disassembling the fuel assembly or removing it to another location.

SUMMARY OF THE INVENTION

Briefly stated, the present invention is directed towards a nuclear reactor fuel assembly having a bottom nozzle, at least one longitudinally extending control rod guide thimble attached to and projecting upwardly from the bottom nozzle, a plurality of transverse grids spaced along the thimble, an organized array of elongated fuel rods transversely spaced and supported by the grids, and a top nozzle so constructed to be attached to the upper end portion of the thimble in forming an integral assembly while permitting remote removal of selected ones of the fuel rods for on-site examination without disassembling the fuel assembly.

More particularly, the top nozzle includes a transversely extending adapter plate formed by an arrangement of integral crosslaced ligaments that define a plurality of coolant flow openings. The adapter plate is mounted on the upper end portion of the thimble and spaced axially above and disposed transversely over the upper ends of the fuel rods. The overlying relationship is such that the plate's ligaments axially capture the fuel rods, preventing them from moving upwardly through the coolant flow openings. The top nozzle further includes at least one removable plug confined within the adapter plate and positioned over selective fuel rods so as to provide access to at least one of the fuel rods whereby the fuel rod can be removed from the fuel assembly without first removing the top nozzle from the assembly.

In the preferred embodiment, the access plug includes a retainer portion which is disposed between and retained by adjacent ligaments, and a plug portion, preferably in the form of a cylinder, which can be removably inserted into a bore provided in the retainer portion. Further, it is preferred, that the cylinder plug have external threads and the retainer bore be internally threaded whereby the plug can be threadably secured in the retainer. To insure that the access plug does not vibrate loose, locking means are provided in the form of upstanding tabs on the plug portion which are bent over into engagement with indentations provided on the top surface of the retainer portion, adjacent its bore. Axial bores through the plug portion are provided to allow coolant to pass through, but are of a dimensional size, to prohibit a fuel rod from moving upwardly into the plug portion.

Still further, in the preferred embodiment, the top nozzle includes a hold-down plate axially spaced above the adapter plate. The hold-down plate has at least one coolant flow hole defined therethrough and is so mounted on the upper end of the thimble such that its coolant flow hole is positioned over the plug portion, whereby, upon removal of the plug portion from its retainer portion, a fuel rod can be lifted vertically upwardly and out of the fuel assembly. Preferably, this coolant flow hole, in the hold-down plate, has a larger crosssectional dimension than that of the plug portion.

These and other advantages and attainments of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which.

DETAILED DESCRIPTION OF THE INVENTION

Figure 1:
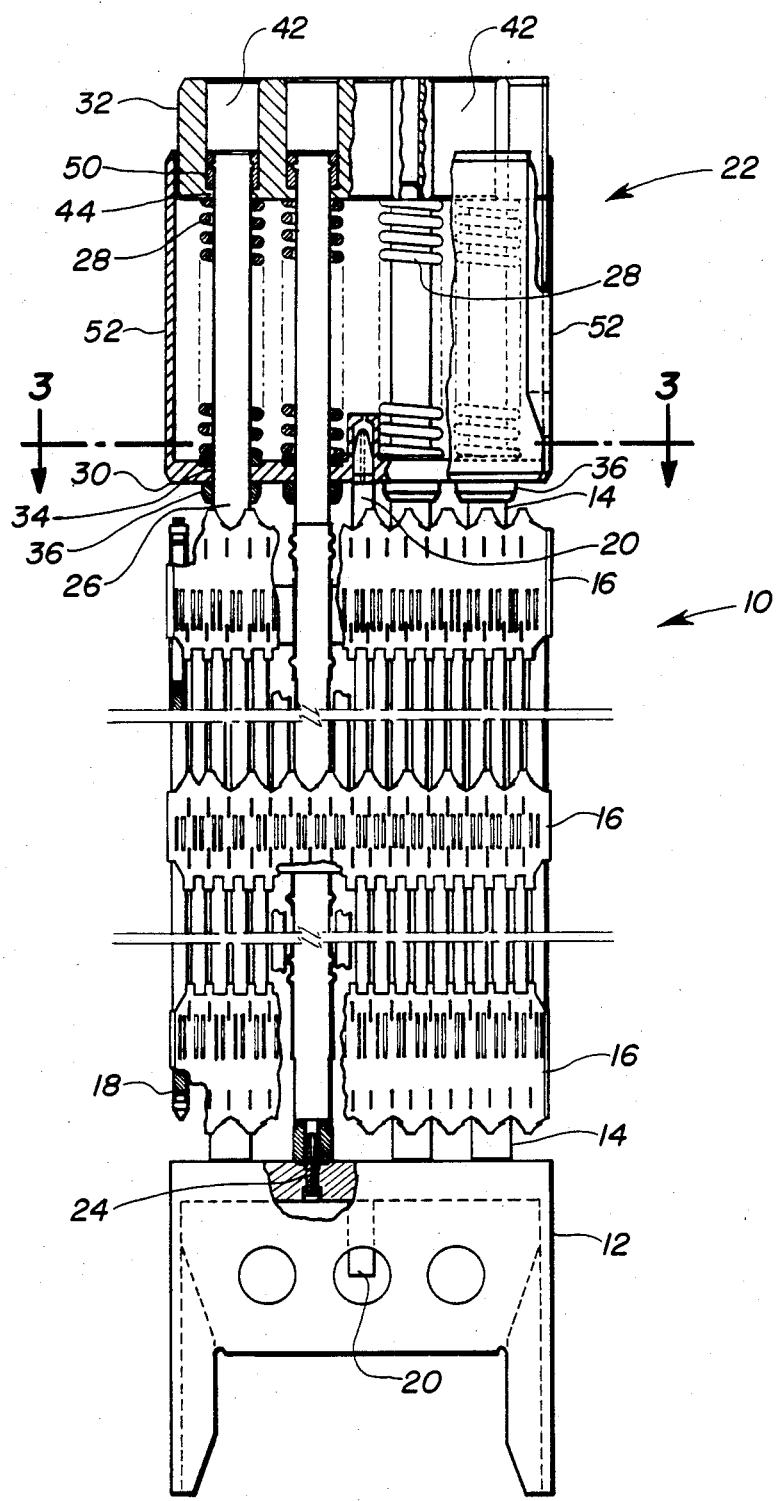
FIG. 1 is a partially sectioned elevational view, with parts being broken away for clarity, of a fuel assembly formed in accordance with the principles of the present invention.

In the following description, like reference characters designate like or corresponding parts throughout the several views. Also, in the following description, it is to be understood that such terms as "forward", "rearward", "left", "right", "upwardly", "downwardly", and the like, are words of convenience and are not to be construed as limiting terms.

In General

Referring now to the drawings, and particularly to FIG. 1, there is shown a partially sectioned elevational view, with parts broken away for clarity, of a fuel assembly constructed in accordance with well known practices, being indicated generally by the numeral 10, which incorporates a preferred embodiment of the invention.

The fuel assembly 10 basically comprises a lower end structure or bottom nozzle 12 for supporting the assembly on the lower core plate (not shown) in the core region of a reactor (not shown); a number of longitudinally extending control rod guide tubes or thimbles 14 projecting upwardly from the bottom nozzle 12; a plurality of transverse grids 16 axially spaced along the guide thimble 14; and an organized array of elongated fuel rods 18 (only one of which being shown in FIG. 1 for clarity) transversely spaced and supported by the grids 16. It should be pointed out here that, in this embodiment, the lower ends of the elongated fuel rods 18 are shown being axially held and spaced above the bottom nozzle 12, however, they may be restably supported on the upper surface of the bottom nozzle 12. An instrumentation tube 20 is located at the center of the fuel assembly 10. Attached to the upper ends of the guide thimbles 14 is an end structure or top nozzle, generally designated by the numeral 22, to form an integral assembly capable of being conventionally handled without damaging the assembly components.

To form the fuel assembly 10, the transverse grids 16 are attached to the longitudinally extending guide thimbles 14 at predetermined axially spaced locations; the fuel rods 18 are inserted from below through the grids 16; the lower nozzle 12 is then suitably attached, such as by machine screws 24, to the lower ends of the guide thimbles; and then the top nozzle 22 is attached to the upper end portions of the guide thimbles 14. To control the fission process, a multiplicity of control rods (not shown) are reciprocally movable in the control rod guide thimbles 14 of the fuel assembly 10.

The fuel assembly 10 depicted in the drawings is of the type having a square array (19×19) of fuel rods 18 with sixteen control rod guide thimbles 14 strategically arranged within the fuel rod array. Further, the bottom nozzle 12 and likewise the top nozzle 22 are generally square in cross section. Still further, each of the control rod guide thimbles 14 have a separate guide thimble extension 26 connected to the upper end of the guide thimble 14 in forming a normal extension to the guide thimble. The guide thimble extension 26, referred to hereafter as thimble extension, is coaxial, having a diameter of substantially the same size as the guide thimble 14, and preferably is connected to the upper end of the guide thimble 14 by a suitable mechanical connection, such as, by bulge fitting, which is well known in the art. In that the specific fuel assembly represented in the drawings is for illustrational purposes only, it is to be understood, that neither the shape of the nozzles, or the number and configuration of the fuel rods and guide thimbles, or the use of thimble extensions are to be limiting, and that the invention is equally applicable to different shapes, configurations, and arrangements than the ones specifically shown.

For illustrational purposes, in the preferred embodiment, the top nozzle 22 is shown in the form of a subassembly having holddown means (device) incorporated therewithin which is the specific subject of the cross-referenced, copending, application of Robert K. Gjertsen et al, entitled "Nuclear Reactor Fuel Assembly With Improved Top Nozzle And Hold-Down Means". The specific design permits the fuel assembly 10 to be placed in the core region with its top surface in direct contact with the upper core alignment/support plate and provides a hold-down force to prevent hydraulic lifting of the fuel assembly, caused by upward coolant flow, while allowing for changes in fuel assembly length, due to core induced thermal expansion and the like.

Briefly, while still referring to FIG. 1, the top nozzle subassembly basically comprises a coil spring 28 disposed about the upper end portion of each guide thimble extension 26 and sandwiched between lower adapter plate 30 and an upper hold-down plate 32. The lower adapter plate 30 is slidably mounted, via holes 34, on the thimble extensions 26 and its downward movement therealong is limited by retainers 36, one of which being mounted on each thimble extension 26 at a location axially spaced above the upper ends of the fuel rods 18. The adapter plate 30 is formed by an arrangement of integral cross-laced ligaments 38 (see FIGS. 2 & 3) that define a plurality of coolant flow openings 40, having an oblong elongated shape, and is so positioned and oriented on the thimble extensions 26, such that portions of the ligaments 38 overlie the upper ends of the fuel rods 18. The overlying relationship is such that the rods are prevented from moving upwardly through the coolant flow openings 40, and thus, fuels rods 18 are axially restrained or captured between the top nozzle 22 and the bottom nozzle 12.

The upper hold-down plate 32 is also slidably mounted on the thimble extensions 26, via respective passageways 42, with each of the passageways having an internal ledge 44 defined therein. Holddown plate 32 is also provided with a number of relatively large coolant flow openings 46 and several smaller coolant flow openings 48 positioned at predetermined locations about the plate. Axially spaced above the retainer 36 is another retainer 50, mounted on each of the thimble extensions 26 and disposed within the respective passageways 42. The retainers 50 cooperate with the internal ledges 44 to limit the upward movement of the hold-down plate 32 along the thimble extensions 26. In defining an enclosure for channeling the coolant flow upwardly at the upper region of the fuel assembly 10, upstanding sidewalls 52 are formed on the peripheral edges of the lower adapter plate 30. For a more detailed understanding and description of the top nozzle subassembly and its specific attachment to the upper end portions of the thimble extensions, reference should be made to the aforesaid copending application. It should be also noted here that the fuel rod removal means of the present invention is not limited to the particular top nozzle subassembly shown and described above, but includes other top nozzle constructions known in the art.

Fuel Rod Removal Means

Figure 2:
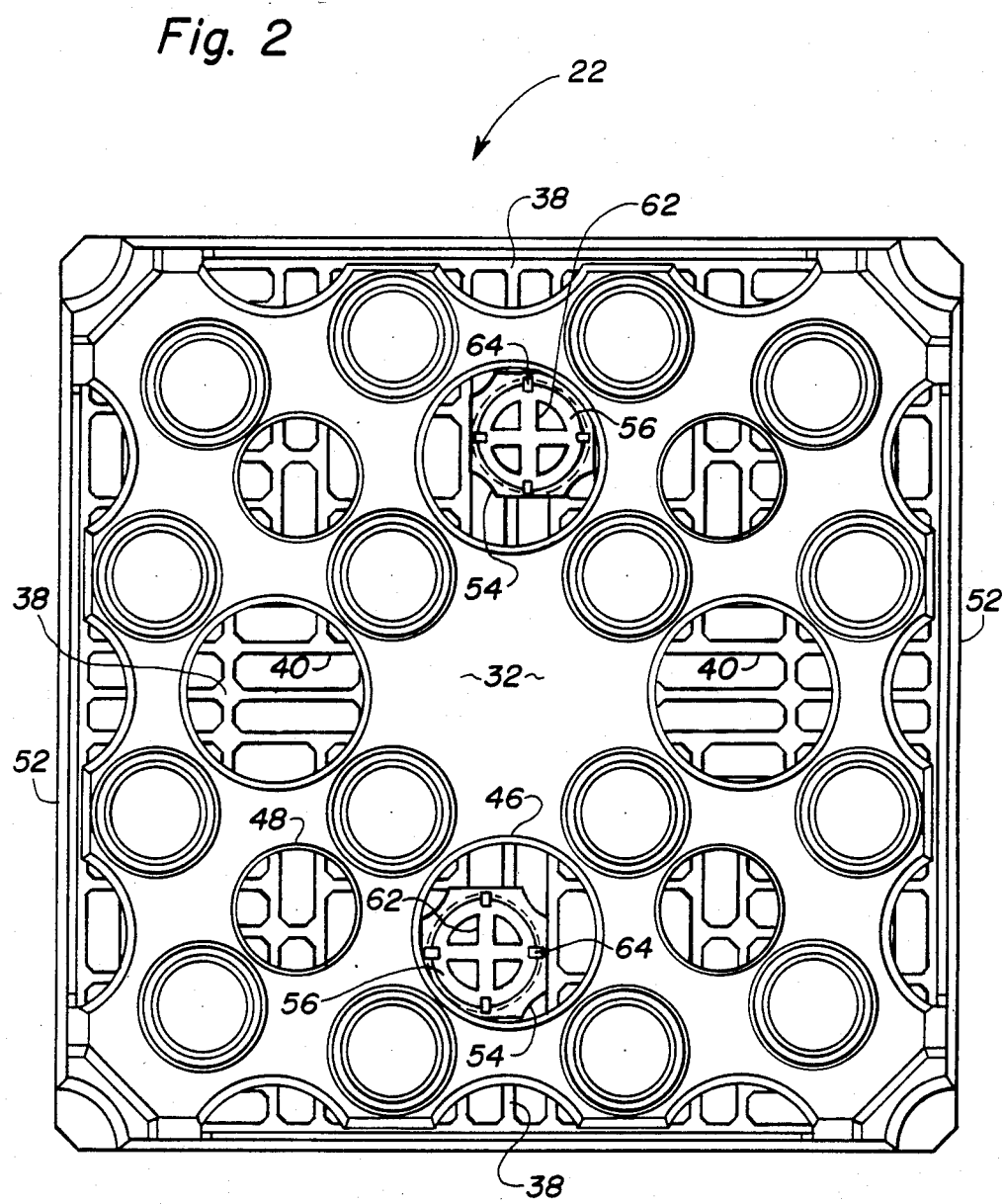
FIG. 2 is an enlarged top plan view of the fuel assembly shown in FIG. 1 with two access plugs being seen provided in the adapter plate of the top nozzle.

In accordance with the present invention, the fuel assembly 10 is provided with means for removing selective ones of the fuel rods 18 from the assembly while being situated within the active core region of a reactor (not shown) and without disassembling the assembly, such as, by removing the top nozzle 22 therefrom. More particularly, as seen in FIGS. 2 and 3, the fuel assembly 10 is provided with a pair of access plugs, each having a retainer portion 54 and a plug portion 56, confined within the lower adapter plate 30 of the top nozzle 22 and specifically located above preselected ones of the fuel rods 18 (see FIG. 3).

Figure 3:
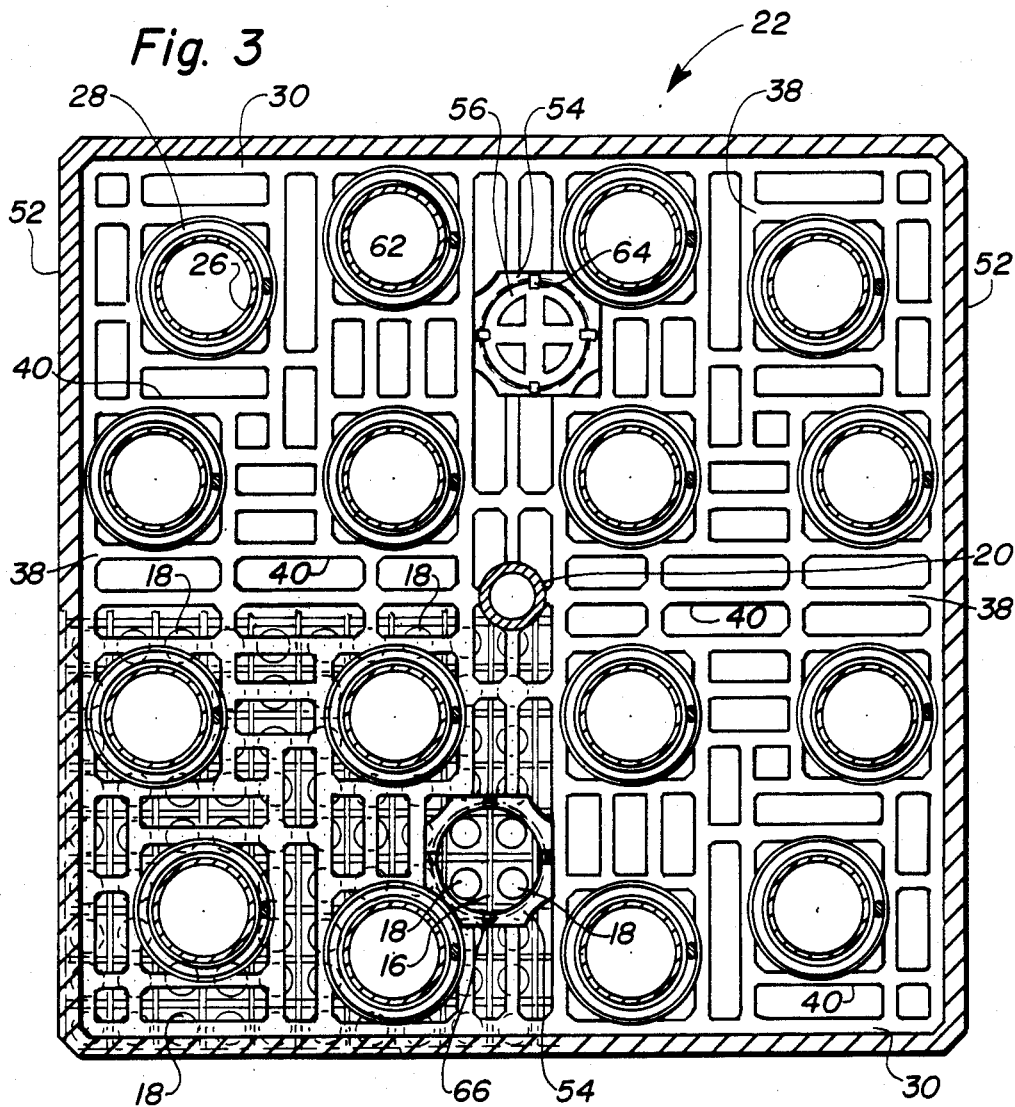
FIG. 3 is an enlarged sectional view, as taken along line 3—3 of FIG. 1, showing one of the access plugs being in place and with the other access plug being removed, exposing four individual fuel rods for removal.
Figure 4:
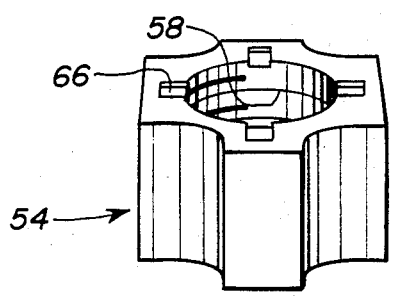
FIG. 4 is an, enlarged, perspective view of the plug retainer portion removed from the top nozzle.

As best seen in FIGS. 3 and 4, each retainer portion 54 is, more or less, of a cross shape having concave corners and is disposed between portions of the ligaments 38. Retainer portion 54 is retained between the ligaments by securing, such as by welding or the like, its lateral faces to the adjacent ligament portions. To locate the retainer portion 54 within the adapter plate 30, predetermined sections or portions of the ligaments 38 are cut and removed to provide the physical space and clearance for proper positioning of the retainer portio 54 between adjacent ligaments 38. In the preferred embodiment, the retainer portion 54 has an axial bore 58 extending therethrough of a diameter sufficient to permit access to and removal of four fuel rods 18. Preferably, the axial bore 58 is internally threaded.

Figure 5:
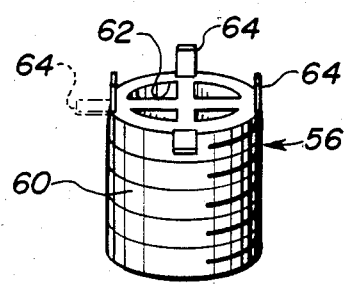
FIG. 5 is an, enlarged, perspective view of the removable plug portion being removed from the top nozzle and showing the four locking tabs which engage the locking indentations provided on the top surface of the plug retainer portion. One of the locking tabs is shown in dotted lines to represent its position when it is bent over into locking engagement with a corresponding indentation.

The plug portion 56 (best seen in FIG. 5) of the fuel rod removal means, preferably is in the form of a cylinder with external threads 60 being inscribed about its outer lateral surface for threadable engagement with the threaded bore 58. Four pie-shaped, axially extending, apertures 62 have been provided in the removable plug portion 56 to allow coolant to flow upwardly therethrough, but are of a cross-sectional dimension, to prohibit a fuel rod from extending and passing therethrough.

In insuring that the plug portion 56 remains threadably secured within the threaded bore 58 of retainer portion 54 and does not unloosen, due to vibration forces and the like during operation of the fuel assembly 10, locking means have been provided in the form of upstanding tabs 64 and indentations 66. Tabs 64 are provided on the upper surface of the plug portion 56 and are adapted to be bent over into locking engagement with the corresponding indentations 66, provided in the top surface of the retainer portion 54. Indentations 66 extend radially outwardly from the threaded bore 58.

As best seen in FIG. 2, the large coolant flow openings 46 are so located in the upper hold-down plate 32 such that one of the coolant holes overlies one of the access plugs and another one of the coolant holes overlies the other one of the access plugs. The overlying relationship or alignment is such that when the plug portion 56 is unscrewed and removed from the retainer portion 54, the upper end of each of the four underlying fuel rods 18 can be grabbed for lifting the rods vertically upwardly through the retainer bore 58 and coolant hole 46 and out of the fuel assembly 10.

As can be appreciated by those skilled in the art, the above described access plugs 56 provide for the removal and replacement of selected ones of the fuel rods 18, while the assembly is situated in the active core region, and without disassembling the assembly by removing the top nozzle, therefrom.

Is thought that the invention and many of its attendant advantages will be understood from the foregoing description and it will be apparent that various changes may be made in form, construction and arrangement thereof without departing from the spirit and scope of the invention or sacrificing all of its material advantages, the form hereinbefore described being merely a preferred or exemplary embodiment thereof.

What is claimed is:

1. A fuel assembly for a nuclear reactor including a bottom nozzle, at least one longitudinally extending control rod guide thimble attached to and projecting upwardly from the bottom nozzle, a plurality of transverse grids spaced along said thimble, an organized array of elongated fuel rods transversely spaced and supported by said grids and axially captured between said bottom nozzle and a top nozzle which comprises:

(a) a transversely extending adapter plate formed by an arrangement of integral cross-laced ligaments defining a plurality of coolant flow openings;

(b) means for mounting said adapter plate on an upper end portion of said thimble and spaced axially above and disposed transversely over the upper ends of all of said fuel rods present in said fuel assembly such that ones of said ligaments overlie corresponding ones of said fuel rods so as to prevent said fuel rods from moving upwardly through said coolant flow openings; and (c) removable plug means confined within said adapter plate and positioned over and spaced axially above selected ones of said fuel rods in providing access to at least one fuel rod for removal thereof upwardly through said axially spaced adapter plate without removing said top nozzle from said fuel assembly, said removable plug means including (i) a retainer portion being disposed between and fixedly retained by adjacent ones of said ligaments and having a bore defined therethrough, (ii) a removable plug portion being of a cylindrical shape adapted to be removably inserted into said bore of said retainer portion, and (iii) means for releasably locking said plug portion in its inserted position within said retainer portion, said locking means including indentations on the top surface of said retainer portion adjacent said bore and upstanding tabs on said plug portion adapted to be bent over into locking engagement with said indentations.

2. The fuel assembly as defined in claim 1, wherein said bore has a cross sectional dimension greater than the cross-sectional dimension of said at least one fuel rod whereby said fuel rod can be lifted upwardly through said bore and out of said fuel assembly.

3. The fuel assembly as defined in claim 1, wherein said bore is internally threaded and said cylindrical plug portion has external threads for threadable engagement of said plug portion into said retainer bore.

4. The fuel assembly as defined in claim 1, wherein said cylindrical plug portion has axially extending apertures defined therethrough of a cross-sectional dimension to prevent a fuel rod from passing therethrough while allowing coolant to flow upwardly therethrough.

5. The fuel assembly as defined in claim 1, wherein said mounting means includes a hold-down plate having at least one coolant flow hole defined therethrough, said hold-down plate being axially spaced above said adapter plate and mounted on the upper end of said thimble with its coolant flow hole being positioned over said plug portion such that when said plug portion is removed from said retainer portion said at least one fuel rod can be lifted vertically upwardly out of said fuel assembly.

6. The fuel assembly as defined in claim 5, wherein said coolant flow hole has a cross-sectional dimension greater than the cross sectional dimension of said plug portion.

7. A fuel assembly for a nuclear reactor including a bottom nozzle, at least one longitudinally extending control rod guide thimble attached to and projecting upwardly from the bottom nozzle, a plurality of transverse grids spaced along said thimble, an organized array of elongated fuel rods transversely spaced and supported by said grids and axially captured between said bottom nozzle and a top nozzle which comprises:

(a) a transversely extending adapter plate;

(b) means for mounting said adapter plate on an upper end portion of said thimble and spaced axially above and disposed transversely over the upper ends of all of said fuel rods; and (c) removable plug means confined within said adapter plate and positioned over and spaced above selected ones of said fuel rods in providing access to at least one fuel rod for removal thereof without removing said top nozzle from said fuel assembly, said removable plug means including (i) a retainer portion being fixed to said adapter plate and having a bore defined therethrough, (ii) a plug portion being of a shape adapted to be removably inserted into said bore of said retainer portion and having at least one axially extending aperture defined therethrough of a cross-sectional dimension sized to prevent a fuel rod from passing therethrough while allowing coolant to flow upwardly therethrough, and (iii) means for releasably locking said plug portion in its inserted position within said retainer portion, said locking means including indentations on one of said retainer portion and plug portion and upstanding tabs on the other of said retainer portion and plug portion adapted to be bent over into locking engagement with said indentations when said plug portion is in its inserted position within said retainer portion.

8. The fuel assembly as defined in claim 7, wherein said bore of said retainer portion has a cross-sectional dimension greater than the cross-sectional dimension of said at least one fuel rod whereby said fuel rod can be lifted upwardly through said bore and out of said fuel assembly when said plug portion is removed from said bore.

9. The fuel assembly as defined in claim 7, wherein said bore of said retainer portion is internally threaded and said plug portion has external threads for threadable engagement of said plug portion into said retainer portion bore.

10. A fuel assembly for a nuclear reactor including a bottom nozzle, at least one longitudinally extending control rod guide thimble attached to and projecting upwardly from the bottom nozzle, a plurality of transverse grids spaced along said thimble, an organized array of elongated fuel rods transversely spaced and supported by said grids and axially captured between said bottom nozzle and a top nozzle which comprises:

(a) a transversely extending adapter plate;

(b) means for mounting said adapter plate on an upper end portion of said thimble and spaced axially above and disposed transversely over the upper ends of all of said fuel rods; and (c) removable plug means confined within said adapter plate and positioned over and spaced above selected ones of said fuel rods in providing access to at least one fuel rod for removal thereof without removing said top nozzle from said fuel assembly, said removable plug means including (i) a retainer portion being fixed to said adapter plate and having an internally threaded bore defined therethrough, (ii) a plug portion having external threads thereon and being of a shape adapted to be removably threaded into said bore of said retainer portion of threaded engagement therewith, and (iii) means for releasably locking said plug portion within said retainer portion when disposed in threaded engagement therewith, said locking means including indentations on one of said retainer portion and said plug portion and upstanding tabs on the other of said retainer portion and said plug portion adapted to be bent over into locking engagement with said indentations when said plug portion is disposed in said retainer portion.

11. A fuel assembly for a nuclear reactor including a bottom nozzle, at least one longitudinally extending control rod guide thimble attached to and projecting upwardly from the bottom nozzle, a plurality of transverse grids spaced along said thimble, an organized array of elongated fuel rods transversely spaced and supported by said grids and axially captured between said bottom nozzle and a top nozzle which comprises:
 (a) a transversely extending adapter plate;
 (b) means for mounting said adapter plate on an upper end portion of said thimble and spaced axially above and disposed transversely over the upper ends of said fuel rods; and
 (c) removable plug means confined within said adapter plate and positioned over and spaced above selected ones of said fuel rods in providing access to at least one fuel rod for removal thereof without removing said top nozzle from said fuel assembly, said removable plug means including
  (i) a retainer portion being fixed to said adapter plate and having a bore defined therethrough,
  (ii) a plug portion being of a shape adapted to be removably inserted into said bore of said retainer portion and having at least one axially extending aperture defined therethrough of a cross-sectional dimension sized to prevent a fuel rod from passing therethrough while allowing coolant to flow upwardly therethrough, and
  (iii) means for releasably locking said plug portion in its inserted position within said retainer portion, said locking means including indentations on a top surface of said retainer portion adjacent said bore thereof and upstanding tabs on said plug portion adapted to be bent over into locking engagement with said indentations.

* * * * *